United States Patent Office 3,440,258
Patented Apr. 22, 1969

3,440,258
PREPARATION OF DISODIUM METHYL ARSONATE
Richard L. Urbanowski, Painesville, and Roland P. Steinkoenig, Chardon, Ohio, assignors to Diamond Shamrock Corporation, a corporation of Delaware
No Drawing. Filed Aug. 1, 1966, Ser. No. 569,080
Int. Cl. C07f 9/72
U.S. Cl. 260—442                                              6 Claims This invention relates to a process for the preparation of disodium methyl arsonate from arsenious trioxide, sodium hydroxide, and methyl chloride. The overall reaction can be represented by the following equation:

$$2CH_3Cl + As_2O_3 + 6NaOH \rightarrow 2CH_3AsO(ONa)_2 + 2NaCl + 3H_2O$$

Heretofore the disodium methyl arsonate has been prepared in batch operation by charging a reaction vessel with essentially the total stoichiometric proportions of sodium hydroxide and arsenious trioxide to form intermediate sodium ortho arsenite, and including in the initial charge sufficient methyl halide, such as methyl iodide or methyl chloride to convert the resulting sodium ortho arsenite to disodium methyl arsonate. Alternatively, the methyl halide could be gradually added to the reactor as soon as, or starting shortly after, the reaction vessel was charged with all of the sodium hydroxide and arsenious trioxide. Although yields were good at conditions of elevated temperature and superatmospheric pressure, e.g., yields of 60–70 percent based on the moles of arsenious trioxide converted to moles of disodium methyl arsonate, methods were sought to enhance the conversion above about 70 percent level.

Subsequently it was disclosed in U.S. Patent 2,695,306, in conjunction with U.S. Patent 2,442,372, that approximately 90 percent of a preformed sodium ortho arsenite solution can be converted to disodium methyl arsonate in a separate methylation reactor. However, if during methylation the ratio of sodium to arsenic in the system falls below 3:1, methylation stops, i.e., it is necessary that essentially the stoichiometric proportions of sodium hydroxide and arsenious trioxide, necessary to prepare sodium ortho arsenite, be present in the system. If methylation ceases, substantial increments of sodium hydroxide can be used to initiate further methylation, but such substantial increments undesirably increase the concentration of free alkali in the reaction medium. Such an increase is underirable since it enhances a side reaction resulting in the alkaline hydrolysis of methyl chloride to methyl alcohol, thereby causing the inefficient use of available methyl chloride. To avoid introducing substantial quantities of alkali into the reaction mitxture during methylation, it was therefore proposed to maintain the system at the necessary stoichiometric ratio of sodium hydroxide to arsenious trioxide, by continuously adding (or intermittently adding in small quantities) sodium hydroxide to the tank feeding preformed sodium ortho arsenite to the methylation reactor.

It has now been found that the production of disodium methyl arsonate can be readily and simply extended, e.g., to the preparation of 97 molar percent or more, based on the available moles of arsenious trioxide converted to moles of disodium methyl arsonate. For such enhanced production an essentially batch reaction is used which employs an initial reactant charge and subsequent feed of methyl chloride, but, the initial charge to the reactor contains a portion only of the total sodium hydroxide reactant, and further contains a molar ratio of sodium to arsenic of less than 3:1. Thereafter, the balance of the sodium hydroxide is gradually added to the reactor in proportion to a gradual addition of methyl chloride to the reactor.

By such operation, it is not only possible to enhance the yield of disodium methyl arsonate, but it is also possible at the same time to augment the utilization of methyl chloride. Furthermore, the reaction can proceed in a liquid medium having an enhanced concentration of reactants, thereby assisting in shortening the reaction time, affording cost economy from reduced reactor size, and affording proceessing economy during isolation of reaction product, which process economy also results from reduced residual arsenic in the trivalent state contained in the final reaction product and resulting from the enhanced conversion now achieved.

Broadly the invention relates to the preparation of disodium methyl arsonate by: (a) establishing a liquid reaction medium in a reactor, which medium comprises an inert liquid diluent, arsenious trioxide reactant, and a portion of the total sodium hydroxide reactant, the molar ratio of sodium to arsenic in the medium being at least about 0.8:1, but less than 3:1, (b) heating the resulting reaction medium to a temperature within the range from about 50° to about 100° C.; (c) adding gradually to the reactor the methyl chloride, the balance of the sodium hydroxide, and any balance of arsenious trioxide, with the ratio, during addition, of the weight percent of methyl chloride added, based on the total weight of methyl chloride reactant, to the weight percent of sodium hydroxide added, based on the balance of sodium hydroxide reactant, being maintained between about 0.8:1 to about 1.2:1; while (d) pressurizing the reaction medium at a pressure above atmospheric pressure; (e) permitting reaction of the materials in the reactor; (f) maintaining the reactor during reaction within the temperature range from about 50° to about 100° C.; and (g) collecting disodium methyl arsonate.

One aspect of the invention includes pressurizing the reaction medium with methyl chloride gas and permitting reaction of such pressurizing gas, thereby allowing a gradual decrease in pressure on the reaction medium after methyl chloride addition.

Advantageously, for economy, an essentially fixed volume reactor, which is substantially rigid at reaction pressures, is used and gaseous methyl chloride is employed to pressurize the reactor. Typically, after the liquid reaction medium has been established, the initial methyl chloride is gradually added for a few minutes to substantially atmospheric pressure to purge outer gases from the reactor, with about 1–2 weight percent of the total methyl chloride being used for purging. Subsequently, the purge outlet is closed and additional methyl chloride is employed to achieve a reactor pressure of between about 20–200 p.s.i.g., and such pressure is then maintained during addition of the balance of the methyl chloride. Pressure above about 200 p.s.i.g. can be uneconomical, while pressures below about 20 p.s.i.g. only slightly enhance the reaction rate over operation at atmospheric pressure. Preferably, for economy and fast reaction, a pressure of between about 60–120 p.s.i.g. is used.

The reaction temperature is maintained within the range from about 50° to about 100° C., the heating being typically initiated before the methyl chloride purge. A reaction temperature below about 50° C. will generally impair the formation of disodium methyl arsonate while a temperature above about 100° C. can produce product degradation. For enhanced reaction without product degradation, the reaction temperature is preferably maintained within the range from about 60° to about 90° C.

The liquid reaction medium can be prepared dispersion, subsequently charged to the reactor, and containing sodium hydroxide plus arsenious trioxide in a diluent, or these reactants, and diluent, can be each added separately to the reactor. For efficient operation, the initial charge is prepared prior to addition to the reactor as a readily pumpable liquid dispersion containing about 15–30 weight percent arsenious trioxide, based on the total weight of the initial charge. In the preparation of the charge the arsenious trioxide used is typically in solid form, the diluent is water, and the sodium hydroxide is an aqueous caustic solution having about 35–70% strength, i.e., 35–70 weight percent of available sodium hydroxide.

For economy the initial charge of reactants preferably contains the total amount of arsenious trioxide which is to be fed to the reactor, although lesser amounts, e.g., 50–90 molar percent of the total arsenious trioxide, can be used in the charge and the balance thereafter added, gradually or in a single increment, as the reaction progresses. In the charge the mole ratio of sodium to arsenic is kept at less than 3:1 to repress available free alkali but is at least about 0.8:1 to enhance reaction efficiency. For best reaction efficiency with free alkali suppression, the mole ratio of sodium to arsenic in the charge is preferably between about 0.8–1.2:1. If the initial charge does not contain the total arsenious trioxide, the balance is added to maintain the molar ratio of sodium to arsenic below 3:1 for as long as possible.

After the initial charge is added to the reactor and the reactor purged with methyl chloride, the additional sodium hydroxide and corresponding feed of methyl chloride are added gradually, either incrementally or continuously. For economy, the additional sodium hydroxide is preformed as an aqueous solution, as is any additional arsenious trioxide. The methyl chloride is generally pumped to the reactor as a liquid and flashes to the gaseous state upon entering the reactor.

Eventually, during addition of added reactants, the ratio of sodium to arsenic in the reactor will preferably reach and surpass the 3:1 level for reaction efficiency, i.e., preferably an excess of sodium hydroxide above stoichiometric requirements is eventually used to enhance the conversion of any remaining arsenious trioxide. Typically, however, about 75 molar percent or more of the total arsenious trioxide will be converted to disodium methyl arsonate prior to reaching this 3:1 level. During addition of reactants, the addition of the balance of the sodium hydroxide is harmonized with the methyl chloride feed to assist in suppressing the free sodium hydroxide available in the reactor. Advantageously, to obtain good suppression, the ratio of the weight percent of methyl chloride added, based on the total methyl chloride reactant, to the weight percent of sodium hydroxide added, based on the weight of the sodium hydroxide balance, i.e., the sodium hydroxide added after the initial charge, is maintained between about 0.8–1.2:1. Preferably, for best control of free sodium hydroxide this ratio is about 1:1, for example, when about 50 weight percent of the methyl chloride has been added, there has also been added about 50 weight percent of the balance of the sodium hydroxide reactant. By operating in this manner, the amount of free sodium hydroxide is usually maintained at or below about 5 weight percent, based on the total weight of the liquid reaction medium. Preferably, a slight excess of methyl chloride is employed (beyond the stoichiometric amount called for in the equation presented hereinbefore) to enhance the conversion of virtually all of the arsenious trioxide to disodium methyl arsonate.

Following the addition of all, or essentially all of the reactants, e.g., 95–100 percent of the reactants, the contents of the reaction vessel are allowed to "digest." As the term is used herein, the "digestion" period is the period following charging of essentially all reactants to the reactor and continuing until the reaction virtually ceases; the term is used herein for convenience and represents only the terminating portion of the time wherein reaction of the materials in the reactor is permitted. During the digestion time, as reaction continues, the arsenious trioxide is virtually all reacted, leaving typically about 0.8 percent or less of arsenious trioxide in the final reaction material, based on the total arsenious trioxide fed to the reactor.

Also, the percent of free alkali can decrease, for example, from a 4–5 percent level down to 2 percent or less. The digestion is also accompanied by a drop in pressure within the reaction vessel where the methyl chloride reactant has been used in obtaining or to completely provide superatmospheric pressure conditions during the reaction, for a substantially rigid reactor having an essentially fixed volume.

Such a drop in pressure can assist in signifying termination of the digestion. Typically for a peak reaction pressure of about 60–90 p.s.i.g., where methyl chloride has been used completely for obtaining such pressure, a conversion of about 96–98 percent i.e., the molar percent of arsenious trioxide converted to moles of disodium methyl arsonate, will be obtained when the pressure has dropped to about 5–10 p.s.i.g. During digestion, the temperature of the reaction medium is advantageously maintained within the range from about 50° to about 100° C. to shorten digestion time.

During digestion, but before discharge of the reactor contents, samples of the reaction medium are usually taken, e.g., about every 30–60 minutes, and analyzed for inorganic arsenic by iodimetric titration until consecutive samples show virtually similar results. When methyl chloride is used to pressurize the reactor, such sampling can be initiated when the reactor pressure has decreased to an essentially constant level, e.g., is virtually unchanged for about 15–30 minutes.

Typically a reaction vessel is a substantially rigid reactor, which also has an essentialy fixed volume. However, reactors employing pistons, or other means for obtaining pressure during reaction, can also be employed. Typically the reactor is equipped with agitation means, heating means, product outlet, purge outlet (vent), pressure gauge, reactant inlet for charging the reactor to establish a liquid reaction medium and reactant inlets for subsequent feed, after charging, of sodium hydroxide and methyl chloride.

The reaction is initiated and continued in a liquid reaction medium obtained from a diluent, preferably water for efficiency and economy. In addition to the reactants and diluent, the reaction medium can contain minor amounts of catalysts or promoters, e.g., a mixture of a saturated aliphatic ketone with high boiling mineral spirits.

Following the digestion period, the disodium methyl arsonate can be isolated from the reaction medium by allowing the medium to cool and filtering off precipitated disodium methyl arsonate. During cooling, precipitation can be augmented by the addition of a suitable liquid, such as isopropanol for use with an aqueous reaction medium. Disodium methyl arsonate of enhanced purity can be obtained by water washing precipitated product or dissolving the product in water and reprecipitating, with or without alcohol addition.

The following examples each show both a manner in which the invention has been practiced as well as comparative exemplary results which are not illustrative of the present invention; the portion of each example illustrating the practice of the present invention should not be construed as limiting the invention.

In the examples the "Percent Conversion" heading in Table 1 for the disodium methyl arsonate, during the progression and at the completion of the reaction, refers to the moles of arsenious trioxide converted to moles of disodium methyl arsonate expressed as the percent converted and based on the moles of arsenious trioxide usde. The "methyl chloride efficiency" referred to in the examples is the moles of methyl chloride converted to disodium methyl arsonate, expressed as the molar percent converted and based on the total moles of methyl chloride employed. The free NaOH in Table 1 is the weight percent of unreacted NaOH in the reaction medium based on the total weight of the contents of the reactor. The disodium methyl arsonate prepared in each example is determined by hydrochloric acid titration.

EXAMPLE 1

The reactor employed is a 10-gallon jacketed stainless steel vessel equipped with agitation means. The reactor is used for two runs; Run A is conducted according to invention principles and Run B is conducted in accordance with the practice of methylating a reactor charge wherein the molar ratio of sodium to arsenic at the outset of methylation is at least 3:1 and such run is not illustrative of the procedures of the present invention.

In Run A conducted according to invention principles the reactor is initially charged with a preformed aqueous dispersion prepared from 23 lbs. water, 8.75 lbs. of arsenious trioxide, i.e., the total amount of arsenious trioxide for the run, and 3.56 lbs. of sodium hydroxide, i.e., the charge contains a molar ratio of sodium to arsenic of 1.03:1. Additionally, the preformed dispersion contains 3.50 lbs. of a promoter consisting of 10% by volume of methyl ethyl ketone and 90% by volume of mineral spirits having a boiling range of about 300–320° F.

In Run B which is not illustrative of the procedures of the present invention, the initial charge to the reactor, containing the total sodium hydroxide and arsenious trioxide for reaction, is a preformed dispersion prepared from 32.08 lbs. of water, 8.75 lbs. of arsenious trioxide, and 11.67 lbs. of sodium hydroxide, i.e., a molar ratio of sodium to arsenic of 3.3:1. Additionally, the initial charge contains 3.50 lbs. of the promoter described hereinabove.

In Run A and Run B after the initial charge to the reactor, the charge is heated to 70° C. and then methyl chloride is used, at atmospheric pressure, to purge atmospheric air from the reactor until a virtually pure methyl chloride atmosphere is achieved. Thereafter in both runs the purge is stopped, the vent closed, and continuous methyl chloride addition, referred to in the table below as "$CH_3Cl$ Addition" is initiated and continued to provide the weight addition of methyl chloride shown in the table below. This methyl chloride addition is used to increase the pressure within the reatcor until a reaction pressure of 80 p.s.i.g. is obtained and such pressure is maintained until the total methyl chloride is added. In both runs liquid methyl chloride is metered to the reactor and flashes to the gaseous state upon entering the reactor.

In Run A, conducted according to invention principles, the balance of the sodium hydroxide is added to the reactor, starting after the methyl chloride purge, and commensurate with the methyl chloride addition after the purge, to provide the weight addition of sodium hydroxide shown in the table below. The added sodium hydroxide is in the form of a 50% caustic soda solution, i.e., a solution of 50 weight percent sodium hydroxide and 50 weight percent water, but the total pounds of "NaOH Addition" listed in the table below are pounds of 100% pure caustic soda.

The reaction temperature in both Run A and Run B is maintained within the range from about 70° to about 80° C.

TABLE 1.—RUN A ILLUSTRATING THE PRESENT INVENTION

| Run Time Percent of Total | $CH_3Cl$ Addition | | NaOH Addition | | Free NaOH | Mole Ratios | | Percent Conversion |
|---|---|---|---|---|---|---|---|---|
| | Total Pounds | Percent of Total | Total Pounds | Percent of Total | | Added NaOH $As_2O_3$ Charged | Free NaOH $As_2O_3$ Charged | |
| 0.0 | 0.00 | 0 | 3.56 | 31 | 1.0 | 2.06 | 0.20 | 0.0 |
| 10.4 | 2.19 | 41 | 6.87 | 59 | 5.1 | 3.89 | 1.28 | 43.7 |
| 29.2 | 4.31 | 80 | 10.09 | 86 | 3.0 | 5.72 | 0.87 | 73.6 |
| 38.8 | 5.36 | 100 | 11.68 | 100 | 5.0 | 6.60 | 1.48 | 86.6 |
| 100.0 | 5.36 | 100 | 11.68 | 100 | 1.7 | 6.60 | 0.50 | 97.8 |
| RUN B—NOT ILLUSTRATIVE OF THE PRESENT INVENTION | | | | | | | | |
| 0.0 | 0.00 | 0 | 11.67 | 100 | 15.5 | 6.60 | 4.60 | 0.0 |
| 6.2 | 1.56 | 28 | 11.67 | 100 | 13.5 | 6.60 | 4.00 | 30.0 |
| 39.6 | 3.63 | 65 | 11.67 | 100 | 7.9 | 6.60 | 2.32 | 65.4 |
| 52.0 | 5.62 | 100 | 11.67 | 100 | 2.8 | 6.60 | 0.83 | ---------- |
| 100.0 | 5.62 | 100 | 11.67 | 100 | 2.1 | 6.60 | 0.63 | 92.8 |

As is seen from the above table a conversion of 92.8 percent is obtained when the molar ratio of sodium to arsenic in the charge is maintained (in accordance with the prior art) at a level of 3.3:1. Comparatively when such level in the charge is only 1.03:1 and does not reach 3:1 until about 75 percent conversion, the total conversion obtained is 97.8 molar percent. This 5 percent molar increase is an extension in yield at an already extremely high production level, and is an extension which has been impossible to economically and efficiently achieve heretofore, but is now readily and simply obtained by the practice of this invention. Additionally it is obtained simultaneously with enhanced utilization of methyl chloride. Run B achieves 92.8 percent conversion with 5.62 pounds of methyl chloride, i.e., a 73.6% methyl chloride efficiency; comparatively, Run A shows 97.8 percent conversion with the use of only 5.36 pounds of methyl chloride, i.e., an 81.3% (or 7.7% greater) methyl chloride efficiency.

EXAMPLE 2

The reactor described in Example 1 is employed again for a Run A conducted according to invention principles and a comparative Run B which is illustrative of prior procedures.

In Run A, the reactor is initially charged with a preformed aqueous dispersion prepared from 23 lbs. water, 8.75 lbs. of arsenious trioxide, i.e., the total amount of arsenious trioxide for the run, and 3.56 lbs. of sodium hydroxide. Additionally, the preformed dispersion contains 3.50 lbs. of a promoter consisting of 2.15% by volume of methyl ethyl ketone and 87.85% by volume of mineral spirits having a boiling range of about 300–320° F. In Run A the balance of the sodium hydroxide is handled in the manner described in Example 1.

In comparative Run B the initial charge to the reactor, containing the total sodium hydroxide and arsenious trioxide for reaction, is a preformed dispension prepared from 22.06 lbs. of water, 8.75 lbs. of arsenious trioxide, and 11.16 lbs. of sodium hydroxide, i.e., a molar ratio of sodium to arsenic of 3.15:1. Additionally, the initial charge contains 6.92 lbs. of a promoter consisting of 1.02% by volume of methyl ethyl ketone and 98.98% by volume of the mineral spirits described hereinabove.

In Run A and Run B after the initial charge to the reactor, the charge is heated and then methyl chloride is used, at atmospheric pressure, to purge atmospheric air from the reactor until a virtually pure methyl chloride atmosphere is achieved. Thereafter in both runs the purge is stopped, the vent closed, and continuous methyl chloride addition, referred to in the table below as "CH₃Cl Addn." is initiated and continued to provide the weight addition of methyl chloride shown below in the table. Methyl chloride, in addition, initially pressurizes and then maintains reactor pressure (pressures are also shown below in the table). In both runs liquid methyl chloride is metered to the reactor and flashes to the gaseous state upon entering the reactor.

TABLE 2
RUN A—ILLUSTRATING THE PRESENT INVENTION

| Run Time, min | Pressure, p.s.i.g. | Temp., °C. | $CH_3Cl$ Addn., Total lbs. | NaOH Addn., Total lbs. |
|---|---|---|---|---|
| 0 | | 68 | 0 | 3.56 |
| 10 | 80 | 68 | 1.81 | 6.31 |
| 55 | 80 | 71 | 3.63 | 9.07 |
| 85 | 80 | 67 | 4.81 | 10.87 |
| 103 | 80 | 70 | 5.38 | 11.70 |
| 130 | 48 | 82 | 5.38 | 11.70 |
| 190 | 18 | 80 | 5.38 | 11.70 |
| 265 | 6 | 80 | 5.38 | 11.70 |
| 310 | 6 | 80 | 5.38 | 11.70 |

RUN B—NOT ILLUSTRATIVE OF THE PRESENT INVENTION

| Run Time, min | Pressure, p.s.i.g. | Temp., °C. | $CH_3Cl$ Addn., Total lbs. | NaOH Addn., Total lbs. |
|---|---|---|---|---|
| 0 | | 66 | 0 | 11.13 |
| 10 | 70 | 70 | 1.31 | 11.13 |
| 70 | 68 | 68 | 2.69 | 11.13 |
| 175 | 70 | 70 | 5.0 | 11.13 |
| 213 | 70 | 67 | 5.56 | 11.13 |
| 250 | 54 | 78 | 5.56 | 11.13 |
| 310 | 32 | 77 | 5.56 | 11.13 |
| 370 | 22 | 76 | 5.56 | 11.13 |
| 390 | 20 | 76 | 5.56 | 11.13 |

For the runs shown in the table above, Run A achieves a 96.3% molar conversion of arsenious trioxide whereas Run B achieves only an 89.6% molar conversion. Furthermore enhancement in conversion is accompanied with an enhancement in methyl chloride efficiency, i.e., from 71.9% in Run B to 79.8% in Run A.

Although the NaOH addition in Run B is below the amount in Run A, it nevertheless provides a ratio of sodium to arsenic of 3.15:1 (above the stoichiometric requirements). Moreover, although the pressure in Run B is slightly reduced from the Run A pressure, Run B operates with about 98% more promoter, about 3.3% more methyl chloride, and involves an extended period of methyl chloride addition to provide ample time for reaction. As is readily seen from the above table, the reaction in Run A (extended to 310 minutes) is virtually ended at 265 minutes, i.e., after 162 minutes of digestion, when the pressure reaches 6 p.s.i.g. Comparatively, Run B ends at 390 minutes and at 20 p.s.i.g. but involves a 177 minute digestion period (about ¼ hour longer digestion than for Run A to reach 6 p.s.i.g.).

While certain representative embodiments and details have been shown for the purpose of illustrating the invention, it will be apparent to those skilled in the art that various changes and modifications may be made therein without departing from the spirit or the scope of the invention.

What is claimed is:

1. A process for the liquid phase preparation of disodium methyl arsonate from arsenious trioxide, sodium hydroxide, and methyl chloride at superatmospheric pressure and elevated temperature, which process comprises:
   (a) establishing a liquid reaction medium in a reactor, said liquid reaction medium comprising an inert liquid diluent, arsenious trioxide reactant, and a portion of the total sodium hydroxide reactant, the molar ratio of sodium to arsenic in the medium being at least about 0.8:1, but less than 3:1;
   (b) heating said reaction medium to a temperature within the range from about 50° to about 100° C.;
   (c) adding gradually to the reactor the methyl chloride and the balance of the sodium hydroxide, and adding any balance of arsenious trioxide, with the ratio, during addition, of the weight percent of methyl chloride added, based on the total weight of methyl chloride reactant, to the weight percent of sodium hydroxide added, based on the balance of sodium hydroxide reactant, being maintained between about 0.8:1 to about 1.2:1; while,
   (d) pressurizing said reaction medium at a pressure above atmospheric pressure;
   (e) permitting reaction of the materials in the reactor;
   (f) maintaining said reactor during reaction within the temperature range from about 50° to about 100° C.; and,
   (g) collecting disodium methyl arsonate.

2. The process of claim 1 wherein the reactor is maintained during reaction within the temperature range from about 60° to about 90° C. and said reaction medium is pressurized at a pressure between about 20–200 p.s.i.g.

3. The process of claim 1 wherein the established liquid reaction medium includes the total arsenious trioxide reactant and the molar ratio of sodium to arsenic in the charge is between about 0.8:1 and about 1.2:1.

4. The process of claim 1 wherein unreacted sodium hydroxide in the reactor is maintained below about 5 weight percent, basis total weight of the liquid reaction medium.

5. The process of claim 1 wherein the inert liquid diluent is water and said liquid reaction medium is preformed prior to addition to the reactor.

6. The process of claim 1 characterized by pressurizing said reaction medium with methyl chloride gas by the gradual addition to the reactor of methyl chloride reactant, and permitting reaction of said pressurizing methyl chloride gas, thereby permitting a gradual decrease in pressure on said reaction medium after total addition of methyl chloride gas.

References Cited

UNITED STATES PATENTS

| 1,452,605 | 4/1923 | Hussey | 260—442 |
| 2,442,372 | 6/1948 | Miller et al. | 260—442 |
| 2,695,306 | 11/1954 | Miller et al. | 260—442 |
| 3,106,509 | 11/1963 | Nagasawa | 260—442 X |
| 3,173,937 | 3/1965 | Moyerman et al. | 260—442 |
| 3,322,805 | 5/1967 | Schanhals | 260—442 |

TOBIAS E. LEVOW, *Primary Examiner.*

W. F. W. BELLAMY, *Assistant Examiner.*